May 11, 1943.  H. L. MUELLER  2,318,880
HYDRAULIC COASTER BRAKE
Filed March 13, 1940   2 Sheets-Sheet 1

INVENTOR.
HOMER L. MUELLER
BY Oberlin, Limbach & Day
ATTORNEYS.

May 11, 1943.  H. L. MUELLER  2,318,880
HYDRAULIC COASTER BRAKE
Filed March 13, 1940  2 Sheets-Sheet 2
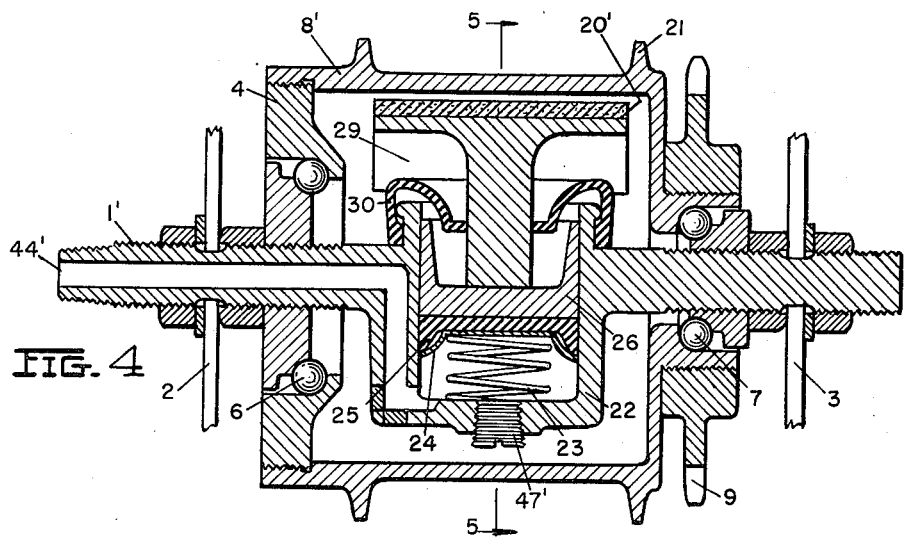
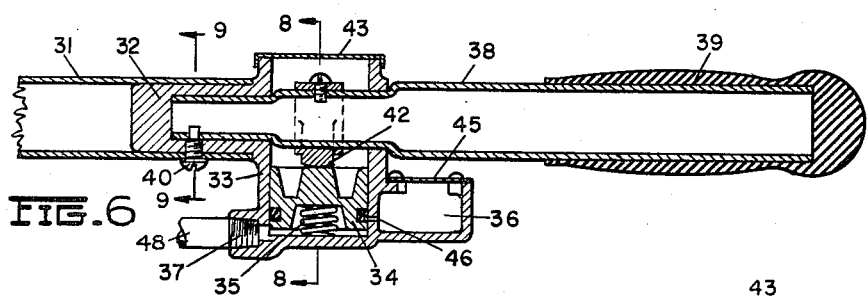
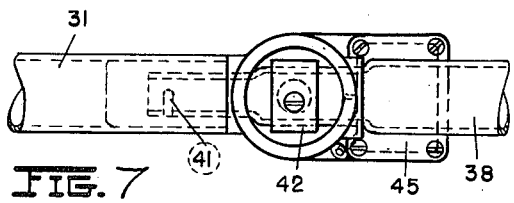
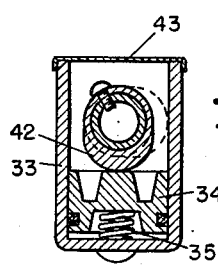
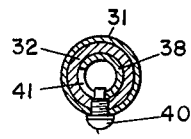
INVENTOR.
HOMER L. MUELLER
BY
Oberlin, Limbach + Day
ATTORNEYS.

Patented May 11, 1943

2,318,880

UNITED STATES PATENT OFFICE 2,318,880

HYDRAULIC COASTER BRAKE

Homer L. Mueller, Cleveland, Ohio, assignor to The Cleveland Welding Company, Cleveland, Ohio, a corporation of Ohio Application March 13, 1940, Serial No. 323,773

2 Claims. (Cl. 188—152)

This invention relates as indicated to hydraulic brakes and more particularly to hydraulic brakes designed for use in bicycles and motorcycles.

It is a primary object of this invention to provide a hydraulic brake of simple construction, positive action and easily regulatable.

Another object of this invention is to provide such a brake which will have a large and effectively disposed braking surface in order that a maximum of braking efficiency may be obtained with a minimum of effort in operation.

Still another object is to provide convenient and novel control means for operating the master cylinder which in turn operates the hydraulic brake.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 4 is a view similar to Fig. 1, but illustrating another embodiment of my invention in which but one hydraulic piston is employed;

Fig. 6 is a vertical sectional view of the hydraulic control means which I employ to operate the braking mechanism;

Fig. 7 is a fragmentary top plan view of a portion of the means illustrated in Fig. 6 with the well cap removed;

Fig. 8 is a view taken along the line 8—8 on Fig. 6; and

Fig. 9 is a sectional view taken along the line 9—9 of Fig. 6.

Figure 1:
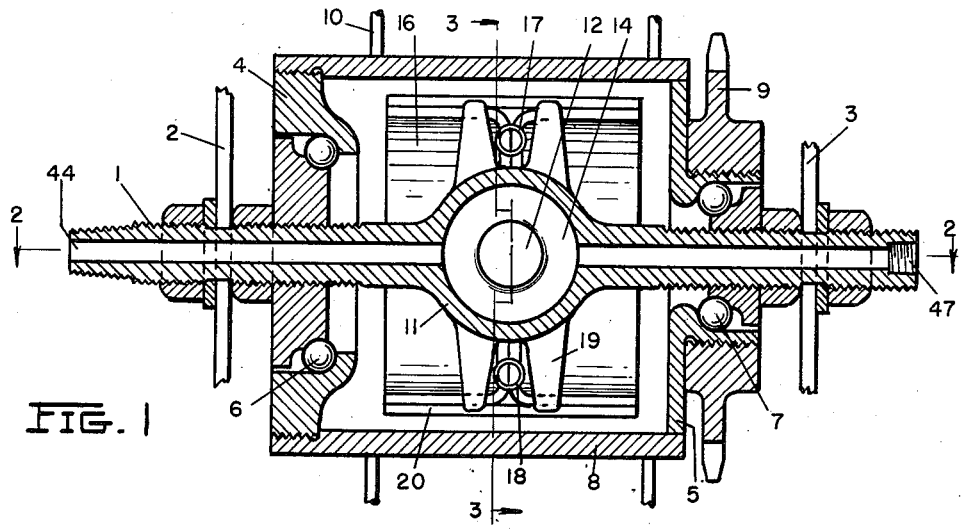
Fig. 1 is a vertical cross sectional view taken through the rear axle and hub of a bicycle employing my new hydraulic brake.
Figure 2:
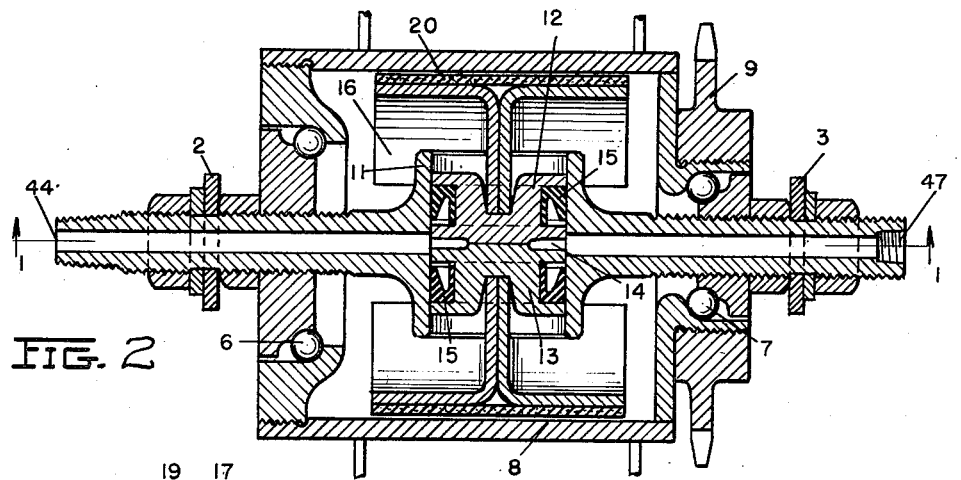
Fig. 2 is a sectional view taken along the line 2—2 on Fig. 1.
Figure 3:
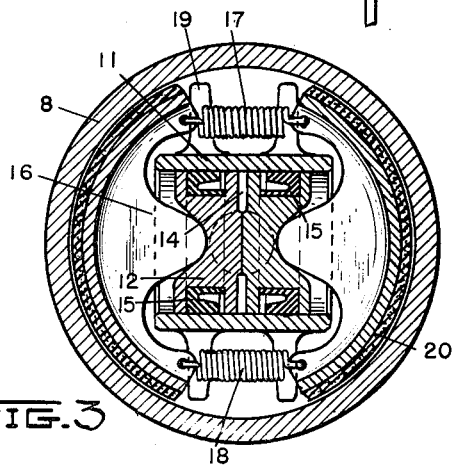
Fig. 3 is a sectional view taken along the line 3—3 of Fig. 1.

Referring now more particularly to the above drawings and especially Figs. 1, 2 and 3, a preferred embodiment of the braking mechanism of my invention comprises a stationary axle 1 supporting rear frame members 2 and 3 of the bicycle. Hub members 4 and 5 ride on ball bearings 6 and 7 forming, together with hub shell 8, a unit which may be driven by the conventional chain drive to sprocket 9. At least one of said members (member 4 as shown) is removable so as to permit the hub to be opened for insertion and removal of the axle with the brake parts presently to be described. Although sprocket 9 is shown in solid cross-section, it will be understood that the same will generally comprise a conventional free wheel unit permitting the rider to coast without movement of the pedals. Wheel spokes 10 are carried by said hub shell.

The axle is cored from end to end and embodies a transversely disposed cylinder 11 centrally located within said hub. Fitting within said cylinder are two pistons 12 and 13 which contact each other in the central portion of their heads but are cut away around their circumference to form a passageway 14 permitting constant communication between all parts of the interior of the axle. Rubber rings 15 are compressed between their seats in the pistons and the cylinder wall, providing a tight seal. Brake shoes 16 engage the ends of each piston and are held in close engagement therewith by release springs 17 and 18, stops 19 keeping the shoes in proper alignment. Said shoes are formed in two parts, as shown, for greater ease in production and assembly. Linings 20 carried by said shoes are operative to contact the inner wall of the hub shell 8 in braking engagement upon outward movement of said pistons 12 and 13.

Figure 5:
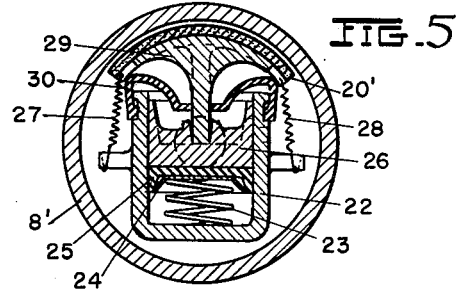
Fig. 5 is a view taken along the line 5—5 of Fig. 4.

The embodiment of my invention illustrated in Figs. 4 and 5 is generally similar to that above described but only one piston and brake shoe is employed. In describing such embodiment like parts will be designated by like numerals. The fixed axle 1' likewise carries rear frame members 2 and 3 and the free wheeling unit comprising hub member 4, hub shell 8' and sprocket 9. Peripheral flanges 21 serve as anchoring means for the inner ends of the spokes of the wheel. The axle 1' is cored only as far as the lower end of cylinder 22 into which such cored portion opens. A coil spring 23 bearing on a brass washer 24 which in turn presses against a rubber washer 25 serves to properly position piston 26 in said cylinder against the force of release springs 27 and 28 which act on brake shoe 29 drawing the same away from the hub shell 8'. Said shoe carries the usual brake lining 20'. A rubber cup or gasket 30 through which the piston engaging portion of said brake shoe passes, seals the upper end of the cylinder.

Referring now to Figs. 6 to 9 inclusive, the control means of my invention is adapted to be operated without the necessity of the rider shifting his hand from the handle-bar. Inserted in the end of the handle-bar 31 is a hollow boss 32 carrying a cylinder 33 in the lower end of which a piston 34 is adapted to move. A spring 35 normally keeps the piston in elevated position permitting communication between fluid reservoir 36 and outlet 37. An extension 38 of said handle-bar with the usual rubber handle 39 is inserted through an opening in the upper portion of said cylinder and secured in place by a screw 40, the end of which enters a slot 41 in said extension member 38. It will be seen that screw 40 thus secures both member 32 and member 38 to the handle-bar proper 31, but permits limited rotative movement of member 38. Secured to member 38 within the upper portion of cylinder 33 is an eccentric cam member 42 operative to bear upon the upper end of piston 34 when handle 39, and thus member 38, is rotated by the operator. The upper end of cylinder 33 is closed by a cap 43. Outlet 37 and opening 44 of the axle may be connected by means of flexible pressure tubing 48 adjacent the steering mechanism and copper tubing along the frame (not shown).

The operation of the mechanisms of my invention may now be easily understood. The whole system is first filled with fluid which may advantageously be introduced to reservoir 36 by removal of cap 45 and which then passes through opening 46 into the lower end of cylinder 33 when the piston 34 is in elevated position, thence through outlet 37 and the copper tubing to the cored axle 1. When the system is full, bleeder plug 47 is inserted in the axle and the mechanism is ready for operation. Considering first the embodiment of Figs. 1 to 3, when handle 39 is rotated, cam 42 forces down piston 34 against the impulse of spring 35, cutting off opening 46 and displacing fluid in the cylinder 33, such displaced fluid forcing pistons 12 and 13 apart, causing the linings of their respective brake shoes to bear upon the inner wall of hub shell 8. Since such hub shell is at a considerable distance from the axis of the axle, even relatively light pressure exerted thereagainst by said brake linings exercises a very efficient braking effect due to the leverage and large braking area available. Also, the operator is not compelled to intervene in any manner as by reversing the direction of rotation of sprocket 9. As a result no additional exterior mechanism of any sort is required, all working parts being contained within the hub.

The embodiment of Figs. 4 and 5 operates in a very similar manner, the hydraulic impulse acting against the effect of springs 27 and 28 forcing brake lining 20' against the inner wall of hub shell 8' and bringing the wheel to a stop.

From the above description it will readily be seen that the mechanism of my invention provides braking means which are instantly effective, efficient in braking capacity, and controllable without the necessity of changing the position of hand or foot, thus enabling the operator to keep both hands on the steering means and his eyes on the road. Furthermore, the braking means of this invention may also be applied to the axle of the front wheel, if so desired, since the operation of the same is entirely divorced from the driving means.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In an hydraulic brake for a bicycle wheel or the like, the combination with an axle and a hollow wheel-carrying hub rotatably mounted at its respective ends on said axle, one of said hub ends being removable; of a transverse, diametrally disposed cylinder formed in said axle, said cylinder having an open end and said axle being formed with a passage leading from one end thereof to said cylinder, a piston reciprocably fitted within said cylinder, and a brake-shoe interposed between said piston and the inner wall of said hollow hub, said axle with said cylinder, piston and brake-shoe being freely insertable in and removable from said hub upon removal of such end of the latter.

2. In an hydraulic brake for a bicycle wheel or the like, the combination with an axle and a hollow wheel-carrying hub rotatably mounted at its respective ends on said axle; of a transverse diametrally disposed cylinder formed in said axle, said cylinder being open at both ends and said axle being formed with a passage leading from its respective ends to said cylinder, two opposed pistons reciprocably fitted within said cylinder, the heads of said pistons being cut away to form a circumferential passageway when said pistons are in contact, and two segmental brake-shoes interposed between said pistons respectively and the inner wall of said hollow hub.

HOMER L. MUELLER.